United States Patent
Clark et al.

(10) Patent No.: US 7,797,575 B2
(45) Date of Patent: Sep. 14, 2010

(54) TRIPLE VOTING CELL PROCESSORS FOR SINGLE EVENT UPSET PROTECTION

(75) Inventors: Scott D. Clark, Rochester, MN (US); Jeffrey J. Ruedinger, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 696 days.

(21) Appl. No.: 11/696,238

(22) Filed: Apr. 4, 2007

(65) Prior Publication Data

US 2008/0250185 A1 Oct. 9, 2008

(51) Int. Cl. *G06F 11/00* (2006.01)
(52) U.S. Cl. .......................................... 714/11; 714/12
(58) Field of Classification Search ............... 714/11, 714/12
See application file for complete search history.

(56) References Cited

U.S. PATENT DOCUMENTS

| | | | |
|---|---|---|---|
| 5,903,717 A * | 5/1999 | Wardrop | 714/12 |
| 6,434,712 B1 * | 8/2002 | Urban et al. | 714/12 |
| 6,862,693 B2 * | 3/2005 | Chaudhry et al. | 714/11 |
| 6,938,183 B2 * | 8/2005 | Bickel | 714/12 |
| 7,065,672 B2 * | 6/2006 | Long et al. | 714/11 |
| 7,107,484 B2 * | 9/2006 | Yamazaki et al. | 714/12 |
| 7,124,319 B2 * | 10/2006 | Watkins et al. | 714/12 |
| 7,308,605 B2 * | 12/2007 | Jardine et al. | 714/11 |

\* cited by examiner

*Primary Examiner*—Philip Guyton
(74) *Attorney, Agent, or Firm*—Bockhop & Associates LLC

(57) ABSTRACT

In a system for operating three address concentrating processors, a common clock signal is transmitted to each of the three address concentrating processors. A common data unit is transmitted simultaneously to each of the three address concentrating processors. A received data unit is received simultaneously from each of the three address concentrating processors. Each of the received data units are compared to each other. An error correcting routine is activated when the data units received from the three address concentrating processors are not all identical.

18 Claims, 2 Drawing Sheets

TRIPLE VOTING CELL PROCESSORS FOR SINGLE EVENT UPSET PROTECTION

BACKGROUND OF THE INVENTION

1. Field of the Invention

The present invention relates to computer processor systems and, more specifically, to a redundant multiprocessor system.

2. Description of the Prior Art

Address concentrating processor systems (such as the Cell processor system) provide power-efficient and cost-effective high-performance processing for a wide range of applications. Typically, such systems have been used in graphics-intensive applications, including the most demanding consumer systems, such as game consoles. Address concentrating processor systems are also useful in computationally-intense applications such as: cryptography, scientific simulation, fast-Fourier transforms (FFT), matrix operations and advanced avionics applications.

An address concentrating processor system is a scalable computational system that distributes computational functions over a hierarchy of individual processors. In an existing address concentrating processor system 10, as shown in FIG. 1, a plurality of processor units/special purpose engines (PU/SPE) 12 perform all of the computational functions of the system 10. Each pair of PU/SPE's 12 is coupled to a lowest-level address concentrating processor (AC2) 14, which collects and distributes commands to and from a higher level address concentrating processor (AC1) 16 to be performed by the individual PU/SPE's 12 to allow a process to be distributed across the two PU/SPE's 12 in an orderly manner. Similarly, each AC2 14 is coupled to a higher-level address concentrating processor (AC1) 16 that orders commands and snoops to the AC2's 14. Ultimately, a highest-level address concentrating processor (AC0) 18 orders commands and snoops to the AC1's 16, thereby ordering execution of the process across the entire system. The AC0 18 must process coherent commands while the AC1 16 can process non-coherent commands. The AC2's 14 can only pass commands and snoops up and down through the system Such a processor system allows high performance distributed computing and is highly flexible, in that additional layers in the hierarchy can be added to increase the computational power of the system. Thus, such systems tend to be highly scalable, in that the number of attached PU/SPE's can be varied, to achieve a desired balance of power versus performance and price versus performance.

Because of their scalability and ability to handle complex computations, address concentrating processor systems could be useful in space and high altitude applications. However, because most systems sent into space cannot be accessed by technicians and because they are subject to radiation-induced errors, any computational system being sent into space (or used for other mission-critical applications) must have an inherent error detection and correction capability.

One type of error detection and correction system that is applied to memory devices such as registers is the triple voting system. In a triple voting system, each unit of data is stored in three separate memory locations and when accessed, each of the three memory locations is accessed simultaneously. The system compares each corresponding bit received from each memory location and, when one bit is different from the other two, accepts the value of the two agreeing bits as the result. The system will also rewrite the memory location that has the disagreeing bit with the accepted bit, thereby correcting the error in the memory location.

Unfortunately, systems developed for game applications often do not have an error detection and correction capability that is sufficient for space applications. Also, given that such systems are typically embodied on one or more computer chips, they cannot be modified so as to have such capability. For example, the Cell processor is a high frequency, manually placed, custom chip, the redesign of which is difficult to change. Thus, applying normal fault mitigation techniques, such as adding triple voting latches, to the internal design of the chip is impractical.

Therefore, there is a need for a system that allows error detection and correction capability to be applied to existing address concentrating processor systems.

SUMMARY OF THE INVENTION

The disadvantages of the prior art are overcome by the present invention which, in one aspect, is an address concentrating processor system for communicating data with an external bus that includes three address concentrating processors, a common clock circuit and a common bridge. Each address concentrating processor includes data processing elements and address concentrating logic. The common clock circuit generates a common clock signal that is applied to each of the address concentrating processors. The common bridge is in communication with each of the address concentrating processors and the common clock signal. The common bridge has a common I/O interface that communicates data with the external bus. The common bridge includes a highest level address concentrator that is in data communication with each of the plurality of address concentrator. The highest level address concentrator is configured to send a command received from any of the lower level address concentrators identically and simultaneously to each of the address concentrating processors so that each of the address concentrating processors processes the data unit simultaneously. The AC0 in the common bridge is configured to apply a triple-voting fault detection algorithm to information received from each of the address concentrating processors, thereby ensuring lock step operation.

In another aspect, the invention is a processor system for communicating data with an external bus that includes three address concentrating processors, a common clock, a common bridge, an I/O controller and a secondary clock circuit. Each address concentrating processor includes data processing elements and address concentrating logic. The common clock generates a common clock signal that is applied to each of the address concentrating processors. The common bridge is in communication with each of the address concentrating processors and the common clock signal. The common bridge has a common I/O interface that communicates data with the external bus. The common bridge includes a highest level address concentrator that is in data communication with each of the plurality of address concentrator. The highest level address concentrator is configured to send a command received from any of the lower level address concentrators identically and simultaneously to each of the address concentrating processors so that each of the address concentrating processors processes the data unit simultaneously. The AC0 in the common bridge is configured to apply a triple-voting fault detection algorithm to information received from each of the address concentrating processors, thereby ensuring lock step operation. The common bridge is also configured to act as a common I/O interface for all processors. The I/O controller is coupled to the common bridge and controls all input/output operations initiated by the address concentrating processors. The secondary clock circuit receives the common signal and generates at least one secondary clock signal that is in phase with the common clock signal. The secondary clock signal is applied to each of the address concentrating processors to provide a timing reference to a preselected processor function of each of the address concentrating processors. The secondary clock signal has a period that is a multiple of a period of the common clock signal.

In yet another aspect, the invention is a method of operating three address concentrating processors, in which a common clock signal is transmitted to each of the three address concentrating processors. A common data unit is transmitted simultaneously to each of the three address concentrating processors. A received data unit is received simultaneously from each of the three address concentrating processors. Each of the received data units are compared to each other. An error correcting routine is activated when the data units received from the three address concentrating processors are not all identical.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1:
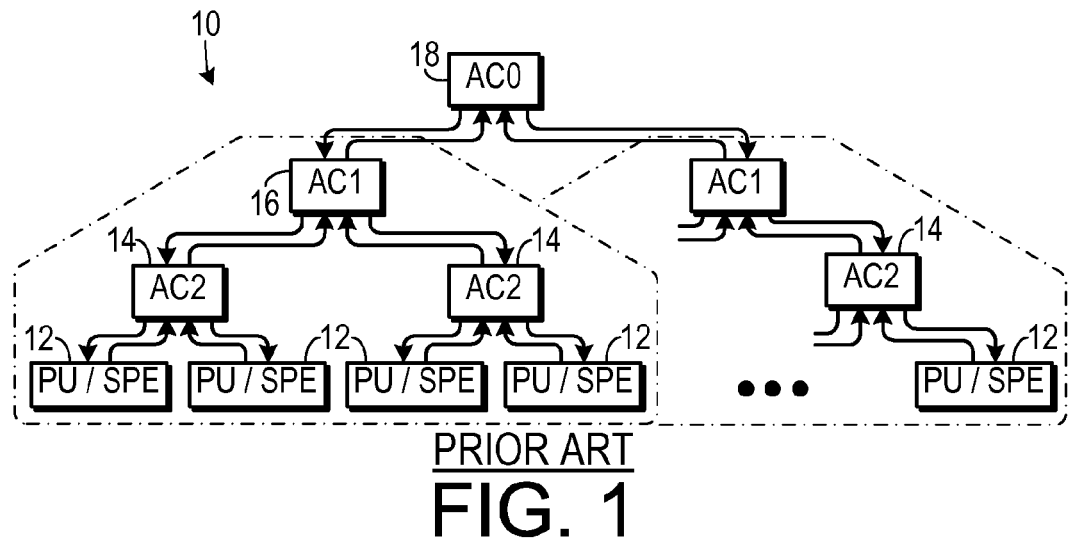
FIG. 1 is a schematic diagram of an existing address concentrating processor system.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

Figure 2:
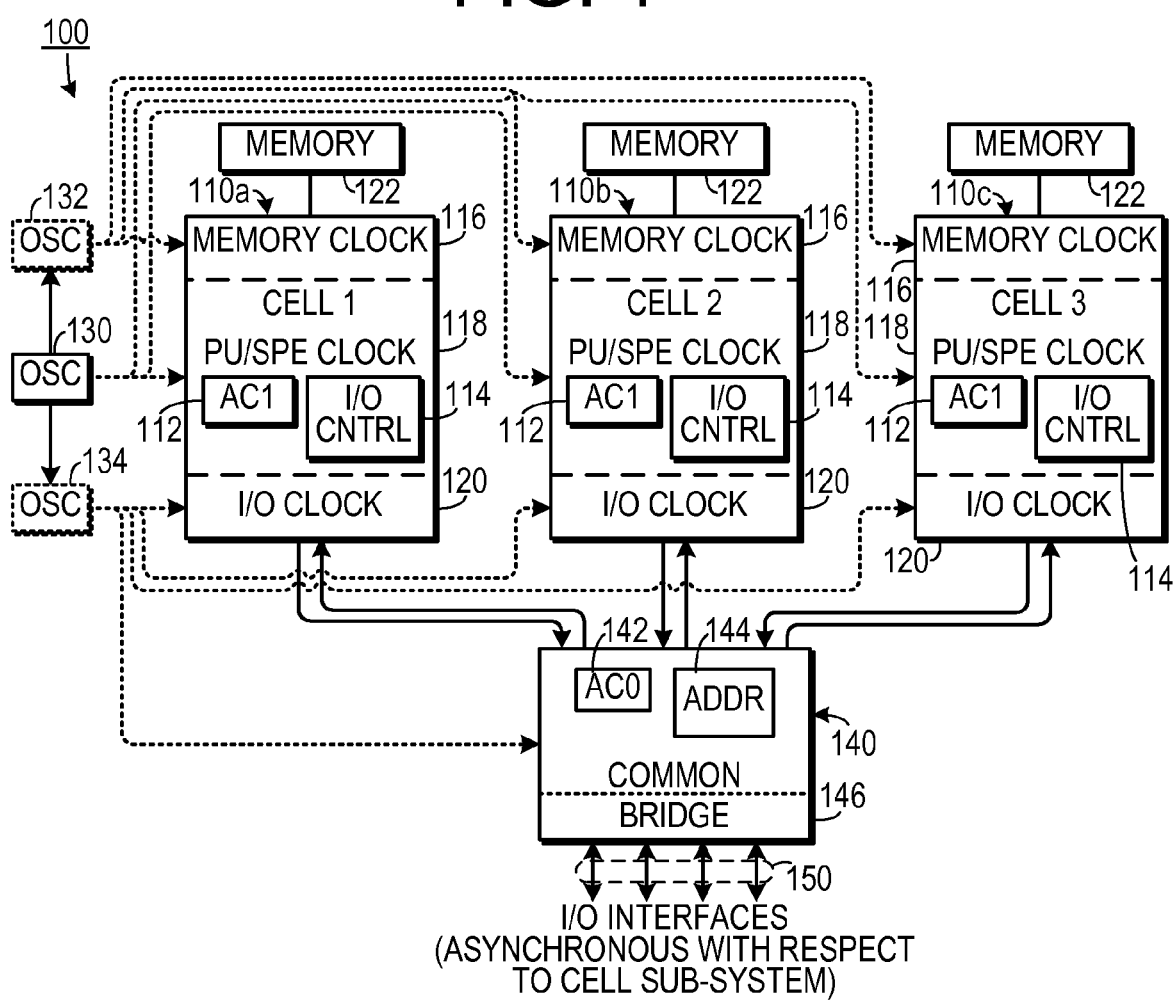
FIG. 2 is a schematic diagram of a first embodiment of a triple voting address concentrating processor system.

One embodiment of an address concentrating processor system 100 that has error and correction capability is shown in FIG. 2. The system 100 includes a common clock circuit 130 that generates a master clock signal, a memory secondary clock circuit 132 that generates a memory clock signal that is based on the master clock signal, and an I/O secondary clock circuit 134 that generates an I/O clock signal.

The system 100 also includes a first address concentrating processor Cell chip 110a, a second address concentrating processor Cell chip 110b and a third address concentrating processor Cell chip 110c. Each Cell 110a-c (which could be embodied as Cell processors, for example) includes an address concentrating tree, represented by a higher-level address concentrator (AC1) 112, which would be coupled to a hierarchy of lower-level address concentrator units, such as AC2's and PU/SPE's. Also associated with each Cell 110a-c is an I/O controller 114 that controls all I/O operations, including cache accesses.

The secondary clock circuits 132 and 134 receive a common signal from the common clock circuit 130 and generate secondary clock signals that are in phase with the signal from the common clock circuit 130 so as to provide a timing reference (which could have a period that is a multiple of the period of the common clock signal) to various processor functions in the Cells 110a-c (such functions could include memory access and input/output control). A PU/SPE clock 118, which is responsive to the common clock circuit 130, drives the AC1 and all subordinate processors (e.g., PU/SPE's). A memory clock 116, which is driven by the signal from the memory secondary clock circuit 132 clocks accesses to a memory 122 and an I/O clock 120 that is driven by the signal from the I/O secondary clock circuit 134 controls input and output operations.

Each of the Cells 110a-c are coupled to a common bridge chip 140, which includes a highest-level address concentrator (AC0) 142 and a common address space 144. The common bridge chip 140 has a common interface 146 that communicates data with an external bus 150.

The bridge chip 140 sends commands received from the common interface 146 identically and simultaneously to each of the Cells 110a-c. Because the bridge chip 140 treats each of the Cells 110a-c identically, they should each process all data that they receive identically and, thus, have identical outputs. If something (e.g., radiation) induces a fault in a bit coming from one of the Cells 110a-c, the common bridge will apply triple voting fault detection to detect it and recover appropriately based on the system error recovery policy of the specific application.

Certain functions performed in the Cells 110a-c are internal to the processor and are not necessarily transmitted to the AC0 142. An internal fault affecting one of these functions might not be detected by the common bridge chip 140 for many cycles after the occurrence of the fault. While it may not be practical to transfer all data relating to such internal functions to the AC0 142, it is possible to detect a fault by performing a periodic scan of all of the registers and data storage elements on each Cell, generating a checksum based thereon and then comparing the resulting checksums. The address space 144 on the common bridge can be used to store the results of the checksum scans. If one of the checksums is different from the other two, one example of application error recovery is for the common bridge chip 140 to enter an error state, halt the process that is currently running and reload the Cell that transmitted the faulty checksum.

In a Cell processor embodiment, the common bridge chip 140 is responsible for communicating the same traffic to all 3 copies of the Cell in the same order, at the same time. Assuming for a moment that all Cells are synchronized to the same clock 130 and start in the same state, all three should execute the same sequence identically.

In addition to the common bridge chip 140 distributing identical I/O traffic streams to the replicated Cells, it also needs to perform results checking to ensure the chips are in sync. While cycle by cycle operation of the internal PUs and SPEs is not exposed externally, the commands and addresses of the internal coherent system bus that connects the internal PUs (in certain applications the internal system bus is referred to as the element interconnect bus—"EIB") can be forced off chip if the chip is set to operate in broadband interface protocol ("BIF") mode. Normally this is used when two Cells are combined to create a larger coherent system of 2 PUs and 16 SPEs. In BIF mode the Cell transmits command requests to an external AC0 block which determines the command order and reflects an ordered command stream to both Cell chips. However in this case even though each Cell remains a collection of compute elements on only a single chip, BIF mode is engaged to force the command requests external to the chip for checking against the other Cells. A common AC0 is needed in the Bridge to order and reflect the command stream, but the Cells are not actually tied together to act as a larger coherent system.

Checking the command streams against each other may not be as good as cycle by cycle comparison of internal operation, but is likely good enough to ensure the same sequences are performed by all Cells since any coherent operation outside the PU or SPE would need to use the EIB and thus be visible to the Bridge chip for checking.

Data marked as non-cacheable, however, may not be broadcast, but can be transferred point to point within the chip. If transferred between PU and memory, SPE and memory, SPE and SPE, or PU and SPE within the same chip, it would not be possible to force it to be visible off chip so another means of checking data must be implemented. To do this, the software driving the system could have each PU and SPE periodically scan through its memory and create a check sum which is then sent to the common bridge chip 140 for comparison. This operation can be kicked off by the common bridge chip 140 since it can insert commands like a synchronization barrier and a check sum initiation instruction into the reflected command stream to each Cell. (A "check sum" operation can be initiated indirectly by inserting a interrupt instruction to each PU causing it to execute check sum code stored in its memory (previously loaded during initialization). The check sum code can then initiate SPE check sum operations so that all local storage is covered). Check sum results can be forwarded to the common bridge chip 140 by giving it an address space 144 that PU and SPE check sum code can target.

Since local commands, which deal only with non-cacheable data transfers between on-chip SPE local stores, are never reflected to the AC0 (they are always handled at the AC1 level inside the chip), either they have to be disabled (which could incur performance penalties) or be considered covered as part of the periodic data checks.

Both interfaces to the Cell chips are connected to the Common Bridge (i.e. Slice 0 BIF and Slice 1 IOIF). The Slice 0 BIF interface carries the address traffic to the AC0 unit in the Common Bridge for comparison of EIB bus traffic, while the Slice 1 IOIF interface carries and compares I/O traffic between the Cell chips and external I/O devices.

Figure 3:
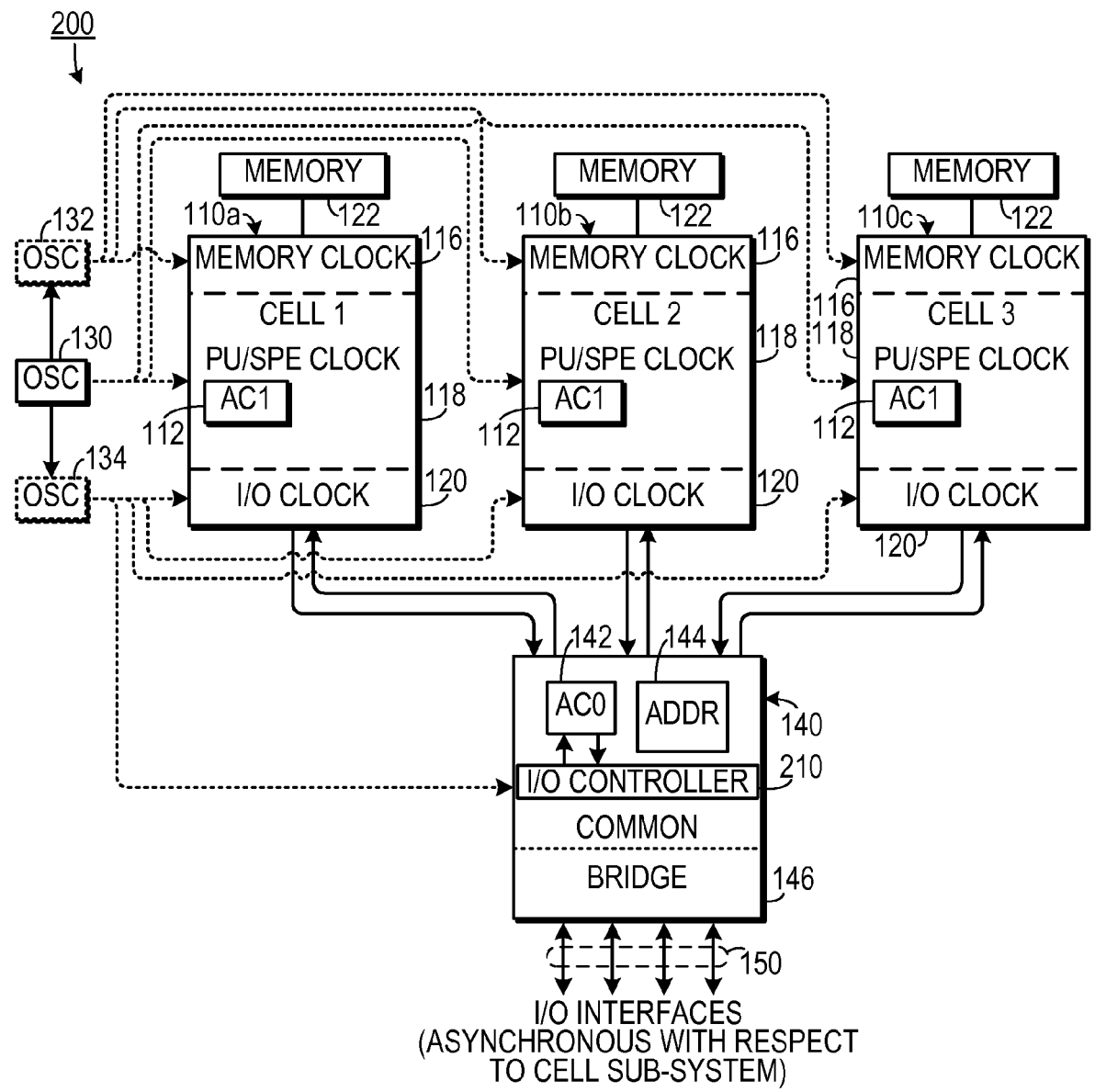
FIG. 3 is a schematic diagram of a second embodiment of a triple voting address concentrating processor system.

In the embodiment shown in FIG. 2, each of the Cells 110a-c include an I/O controller 114 that transmits input/output control functions over an interface separate from the AC0-AC1 connection. These control functions relate to interaction with the external bus 150 and, thus, are simply passed through the common bridge chip 140. The I/O controllers 114 each output several bits and, therefore, the common bridge would require a number of pins equal to three times the number of bits output by each of the I/O controllers 114 to receive each of the I/O control bits. This number of pins could be excessive. Therefore, in the system 200 shown in FIG. 3, the I/O control function is removed from the Cells 110a-c and an I/O controller 210 is added to the common bridge. The I/O controller 210 controls all input/output operations and communicates with AC0 142 via its own AC2/AC1 address concentrator tree also implemented in the common bridge chip 140. I/O data passes to the 3 Cell chips 110a, 110b and 110c over the same interface used to carry commands to AC0 142, thus reducing the number of pins on the common bridge chip 140.

Both solutions require that the Cell chips perform the same action on the same set of input data. The easiest way to ensure this is to run the chips in lock step with one another. (Note that some level of phase adjustment, i.e. +/−1 cycle phase difference, may be unavoidable and therefore would need to be accommodated for by the common bridge chip 140 by using elastic buffer techniques.)

In a single Cell system, there are three clock domains: the internal PU/SPE clock 118, the I/O clock 120, and the memory clock 116. In a single Cell system these can run independent of each other but in the triple vote sub-system these need to be synchronized to the same common oscillator 130 so that all Cells 110a-c will see and respond to stimulus in the same way. As such, certain frequency restrictions may need to be put on the Cell PU/SPE clock domain so that the same oscillator can be used to drive the I/O clock and memory clock domains making the entire system synchronous. In one embodiment, a possible operating condition is using a 3.2 GHz PU/SPE clock 118, making the memory clock 116 3.2 GHz and the I/O clock 120 1.6 GHz (which runs at ½ the frequency of the PU/SPE clock 118). This corresponds to a 4.8 GHz clock at the interface between the Cell 110a-c and common bridge chip 140 (4.8 GHz @ 1 byte on external link=1.6 GHz @ 3 byte inside I/O clock logic).

Asynchronous events can cause the Cells 110a-c to become out of sync with one another. However because interrupts are presented to a Cell chip via envelopes traveling over the I/O interface 146, they can be presented in order with other I/O commands. Thus if normal traffic is synchronized between Cells, interrupts should also be processed in a synchronized fashion.

Drift in clock edges as chips heat and cool is another potential source of getting out clock step. This can be accommodated for by slowing down the operating speed to give a bigger timing margin.

The release of the PU in each Cell to fetch the first instruction may be hard to synchronize precisely as it is controlled through a low speed interface by an external microcontroller which has less stringent timing constraints. This means each PU could initiate the first fetch to the common bridge chip 140 at different times. However logic can be added in the Bridge to wait for all 3 Cells 110a-c to initiate the first fetch request before fulfilling it, thus providing synchronization after this point.

The release of the PU in each Cell 110a-c by the microcontroller also may start free running timers within the Cells 110a-c at slightly different times. However once started, all timers will be incremented at the same rate since the clocks are derived from the same common oscillator 130. The difference in absolute values can be accommodated for by using relative time measurements between timer values rather than absolute timer values in the software. Relative timer values would have to be used to control when DRAM refresh occurs to prevent different response times on memory accesses as this could affect EIB bus timings and ultimately comparison operations at the Bridge.

Some MMIO (Memory Mapped I/O) rings have asynchronous interfaces in them to allow MMIO data to propagate from the core clock to the I/O clock 120 and back to the core clock domain. If the rings were designed without any timing relationship between them, then it would be possible for different chips to introduce a 1 cycle mismatch at each clock crossing depending how quickly the receiving side observed the data. However since the entire Cell chips 110a-c are timed to the core clock for manufacturing test purposes, the relationship between clock domains should appear to occur the same in all chips when all the clock domains are synchronized to the same source.

If the Cells 110a-c were not able to be operated exactly (but only loosely) synchronized to each other, snoop responses to commands on the internal EIB bus could create different decisions within the chips and thus different results to the same command stream. Cache coherent entities within the Cell include the PU and atomic operation controllers within each SPE so this is an issue that needs to be resolved. However by implementing the techniques described the Cells 110a-c should operate in lock step and make the same snoop decision in all 3 copies, so this potential problem should be avoidable.

It should be noted that the techniques disclosed herein may be extendable to any chip that allows coherent checks to be propagated externally.

The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. An address concentrating processor system for communicating data with an external bus, comprising:
    a. three address concentrating processors, each address concentrating processor including data processing elements and a lower level address concentrator;
    b. a common clock circuit that generates a common clock signal that is applied to each of the address concentrating processors;
    c. a common bridge in communication with each of the address concentrating processors and the common clock signal, the common bridge having a common I/O interface that communicates data with the external bus, the common bridge including a highest level address concentrator that is in data communication with each of the plurality of address concentrating processors, the highest level address concentrator configured to send a command received from any of the lower level address concentrators identically and simultaneously to each of the address concentrating processors so that each of the address concentrating processors processes the data unit simultaneously, the highest level address concentrator in the common bridge configured to apply a triple-voting fault detection algorithm to information received from each of the address concentrating processors, thereby ensuring lock step operation; and
    d. a secondary clock circuit that receives the common signal and that generates at least one secondary clock signal that is in phase with the common clock signal, the secondary clock signal being applied to each of the address concentrating processors to provide a timing reference to a preselected processor function of each of the address concentrating processors.

2. The address concentrating processor system of claim 1, wherein the common bridge includes an I/O controller that controls all input/output operations between the highest level address concentrator and the common I/O interface.

3. The address concentrating processor system of claim 1, wherein the preselected processor function comprises a memory clocking function.

4. The address concentrating processor system of claim 1, wherein the preselected processor function comprises an input/output function.

5. The address concentrating processor system of claim 1, wherein the secondary clock signal has a period that is a multiple of a period of the common clock signal.

6. The address concentrating processor system of claim 1, wherein the common bridge is configured to cause each of the address concentrating processors to scan its memory periodically and generate a check sum based on the scan, the common bridge being further configured to compare the check sum from each address concentrating processor and, if each check sum is not the same, then enter an error state.

7. The address concentrating processor system of claim 5, wherein when the common bridge causes each of the address concentrating processors to scan its memory periodically and generate a check sum, the common bridge inserts an interrupt instruction into each of the address concentrating processors so as to cause each of the address concentrating processors to execute a check sum code stored in its memory.

8. The address concentrating processor system of claim 6, wherein the common bridge includes an address space to which results of the check sum for each address concentrating processor are forwarded.

9. A processor system for communicating data with an external bus, comprising:
    a. three address concentrating processors, each address concentrating processor including data processing elements and a lower level address concentrator;
    b. a common clock circuit that generates a common clock signal that is applied to each of the address concentrating processors; and
    c. a common bridge in communication with each of the address concentrating processors and the common clock signal, the common bridge having a common I/O interface that communicates data with the external bus, the common bridge including a highest level address concentrator that is in data communication with each of the plurality of address concentrating processors, the highest level address concentrator configured to send a command received from any of the lower level address concentrators identically and simultaneously to each of the address concentrating processors so that each of the address concentrating processors processes the data unit simultaneously, the highest level address concentrator in the common bridge configured to apply a triple-voting fault detection algorithm to information received from each of the address concentrating processors, thereby ensuring lock step operation;
    d. an I/O controller, coupled to the common bridge, that controls all coherent memory accesses and input/output operations initiated by the address concentrating processors; and
    e. a secondary clock circuit that receives the common signal and that generates at least one secondary clock signal that is in phase with the common clock signal, the secondary clock signal being applied to each of the address concentrating processors to provide a timing reference to a preselected processor function of each of the address concentrating processors, the secondary clock signal having a period that is a multiple of a period of the common clock signal.

10. The processor system of claim 8, wherein the common bridge is configured to cause each of the address concentrating processors to scan its memory periodically and generate a check sum based on the scan, the common bridge being further configured to compare the check sum from each address concentrating processor and, if each check sum is not the same, then enter an error state.

11. The processor system of claim 10, wherein when the common bridge causes each of the address concentrating processors to scan its memory periodically and generate a check sum, the common bridge inserts an interrupt instruction into each of the address concentrating processors so as to cause each of the address concentrating processors to execute a check sum code stored in its memory.

12. The processor system of claim 11, wherein the common bridge includes an address space to which results of the check sum for each address concentrating processor are forwarded.

13. A method of operating three address concentrating processors, comprising the actions of:
- a. transmitting a common clock signal to each of the three address concentrating processors;
- b. transmitting simultaneously to each of the three address concentrating processors a common data unit;
- c. receiving simultaneously from each of the three address concentrating processors a received data unit;
- d. comparing each of the received data units to each other;
- e. activating an error correcting routine when the data units received from the three address concentrating processors are not all identical;
- f. generating at least one secondary clock signal that is in phase with the common clock signal; and
- g. applying the secondary clock signal to each of the address concentrating processors to provide a timing reference to a preselected processor function of each of the address concentrating processors.

14. The method of claim 13, further comprising the action of employing a highest level address concentrator to transmit and receive data units from each of the three address concentrating processors.

15. The method of claim 13, wherein the preselected processor function comprises a selected one of a memory clocking function and an input/output function.

16. The method of claim 13, wherein the action of generating a secondary clock signal comprises generating a signal having a period that is a multiple of a period of the common clock signal.

17. The method of claim 13, further comprising the actions of:
- a. causing each of the address concentrating processors to scan its memory periodically and generate a check sum based on the scan; and
- b. comparing the check sum from each address concentrating processor and, if each check sum is not the same, then entering an error state.

18. The method of claim 13, further comprising the action of inserting an interrupt instruction into each of the address concentrating processors thereby causing each of the address concentrating processors to execute a check sum code stored in its memory.

* * * * *